(12) United States Patent
Takagi

(10) Patent No.: US 6,621,988 B2
(45) Date of Patent: Sep. 16, 2003

(54) CAMERA UTILIZING AN APERTURE SET UP HANDLER

(75) Inventor: Junichi Takagi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/083,610

(22) Filed: Feb. 27, 2002

(65) Prior Publication Data

US 2002/0131775 A1 Sep. 19, 2002

(30) Foreign Application Priority Data

Mar. 19, 2001 (JP) ........................................ 2001-077445
Nov. 28, 2001 (JP) ........................................ 2001-362644

(51) Int. Cl.[7] ........................ G03B 17/18; G03B 7/085; G03B 17/04
(52) U.S. Cl. ........................ 396/287; 396/257; 396/349
(58) Field of Search ................................ 396/238, 257, 396/227, 287, 299, 348, 349, 459

(56) References Cited

U.S. PATENT DOCUMENTS 5,432,574 A * 7/1995 Miyazawa et al. .......... 396/349

FOREIGN PATENT DOCUMENTS

JP          7-1431           1/1995

* cited by examiner

*Primary Examiner*—Russell Adams
*Assistant Examiner*—Arthur A Smith
(74) *Attorney, Agent, or Firm*—Young & Thompson

(57) ABSTRACT

A camera includes a lens barrel capable of extending and collapsing in which when the lens barrel is extended, exposures are possible. The camera includes an aperture member in which any one of a plurality of aperture values can be selected, an aperture set up handler varying a position based on the aperture value, and a coupling member for mechanically coupling the aperture member with the aperture set up handler to transmit the position of the aperture set up handler to the aperture member so that said aperture member is set up to an aperture value according to the position of the aperture set up handler. The aperture member returns to an original setting when the lens barrel is collapsed. The aperture set up handler returns to a position to set up the aperture member to the original setting in accordance with the collapse operation of the lens barrel.

7 Claims, 15 Drawing Sheets

CAMERA UTILIZING AN APERTURE SET UP HANDLER

BACKGROUND OF THE INVENTION

1. Field of the Invention

The present invention relates to a camera having a function of setting up an aperture value.

2. Description of the Related Art

Hitherto, there are known many types of cameras provided with various functions in order that anyone takes a beautiful photograph in a simple way.

Of such types of cameras, there are known cameras each having a function in which when a camera is brought in an operative state, a main power source switch is turned on, and when the camera is brought in an inoperative state, the main power source switch is turned off, and in addition, as in a camera disclosed in Japanese Utility Model Application Laid Open Gazette Hei. 7-1431, a function in which an aperture value is electrically automatically set up before photography and after photography the aperture value is electrically automatically returned to a predetermined aperture value.

However, appending the functions of electrically controlling the aperture value, as disclosed in Japanese Utility Model Application Laid Open Gazette Hei. 7-1431, involves a rise of the manufacturing cost of the camera.

Thus, there is considered, as a camera capable of taking a beautiful photography in a simple way even if anyone operates such a camera, suppressing the cost up, a camera that appends a function of manually setting up an aperture value.

However, in such a camera, there is a possibility that a user forgets setting up of an aperture value and takes photography, and thereby involving a failure of photography.

SUMMARY OF THE INVENTION

In view of the foregoing, it is an object of the present invention to provide a camera reducing a failure of photography due to user's forgetting of setting up of an aperture value, and also implementing reduction of the cost of the camera.

To achieve the above-mentioned objects, the present invention provides a camera having a lens barrel capable of extending and collapsing in which when the lens barrel is extended, a photography is available, said camera comprising:

an aperture member in which any one of a plurality of aperture values is set up in accordance with a mechanical force;

an aperture set up handler varying a position or a posture in accordance with a set up operation for an aperture value; and a coupling member for mechanically coupling said aperture member with said aperture set up handler to transmit the position or the posture according to the set up operation for the aperture value by said aperture set up handler to said aperture member so that said aperture member is set up to an aperture value according to a position or a posture after the set up operation of said aperture set up handler, wherein said aperture member returns to an aperture value of a predetermined opening in accordance with a collapse operation of said lens barrel, and said aperture set up handler returns to a position or a posture to set up said aperture member to the aperture value of the predetermined opening in accordance with the collapse operation of said lens barrel.

According to the camera of the present invention, the aperture value is set up by a user's operation. Thus, as compared with a camera in which an aperture value is automatically set up, it is possible to reduce the price f the camera. Further, according to the camera of the present invention, while the aperture value is set up by a user's operation, the aperture member returns to the aperture value of a predetermined opening by the collapse operation of the lens barrel. Thus, when the aperture value of high frequency in the use is selected to the aperture value of the predetermined opening, it is possible to reduce troublesomeness of the set up operation for the aperture value by a user at the time of the subsequent photography, and further it is possible to reduce a possibility of a failure of the photography due to the user's forgetting of setting up of the aperture value. Further according to the camera of the present invention, when the aperture member returns to the aperture value of the predetermined opening, the collapse operation of the lens barrel is utilized. This feature makes it possible to prevent the aperture value from being inadvertently set up to the aperture value of the predetermined opening.

In the camera according to the present invention as mentioned above, it is preferable that said aperture member is enabled in a direction to be set up to the aperture value of the predetermined opening of the plurality of aperture values, and said camera further comprises a click lever in which in an extension state of said lens barrel, even when said aperture member is set up to any one of the plurality of aperture values, said click is engaged with said aperture member to maintain the aperture value thus set up, and as said lens barrel transfers in a state from the extension state to a collapse state, said click lever at least temporarily releases an engagement with said aperture member to transfer said aperture member to the aperture value of the predetermined opening by an enabling force.

The use of the click lever makes it possible at the time of photography to prevent the aperture value from being inadvertently varied, and further makes it possible at the time of collapse of the lens barrel that the aperture value is reliably returned to the aperture value of the predetermined opening.

Further, in the camera according to the present invention as mentioned above, it is preferable that said camera further comprises a photometry section for measuring brightness of field, and an instruction section for instructing a position or a posture of said aperture set up handler to set up said aperture member to an aperture value according to the brightness of field obtained through measurement by said photometry section.

Making provision of the instruction section makes it possible to guide a user as to the operation of the aperture set up handler and whereby the user can easily set up the aperture value.

In the camera as mentioned above, it is acceptable that said instruction section has a plurality of light-emitting devices disposed at positions according to the position or the posture of said aperture set up handler.

Further in the camera as mentioned above, it is acceptable that each of said plurality of light-emitting devices emits a plurality of lights.

In the camera according to the present invention as mentioned above, it is preferable that said lens barrel is manually extended and collapsed.

Adoption of the lens barrel as mentioned above needs no driving mechanism for driving the lens barrel and thus it is possible to implement further reduction of the price of the camera.

In the camera according to the present invention as mentioned above, it is preferable that said camera further comprises a main power switch, which turns on when the lens barrel is extended, and turns off when the lens barrel is collapsed.

Making provision of the main power switch makes it possible to simplify the operation of the camera and also makes it possible to prevent the useless consumption of power of the battery due to forgetting turning off the main power switch.

DETAILED DESCRIPTION OF PREFERRED EMBODIMENTS

Embodiments of the present invention will be described with reference to the accompanying drawings.

Figure 1:
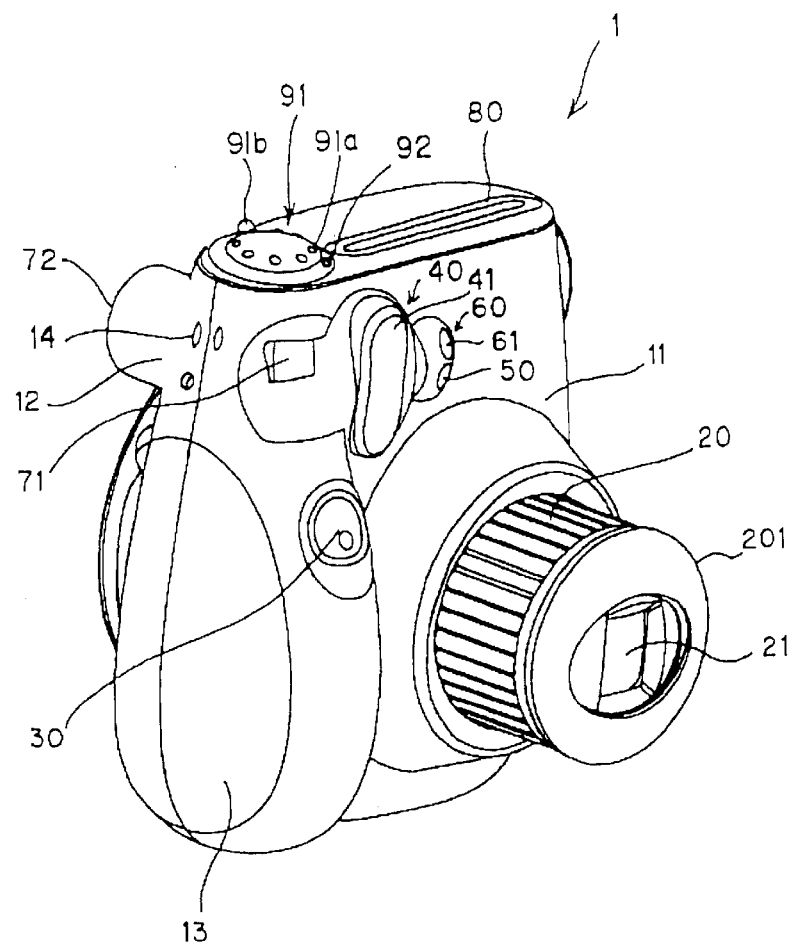
FIG. 1 is a perspective front view of a camera according to an embodiment of the present invention.

FIG. 1 is a perspective front view of a camera according to an embodiment of the present invention.

A camera 1 is an instant camera of such a type in which a film pack for an instant photography, wherein a film unit for an instant photography is laminated, is mounted on the camera.

The film unit used here is exposed on its photosensitive surface with a photographic light, and thereafter a film driving mechanism is driven so that the exposed film unit is developed and discharged out of the camera. The film unit consists of a mono-sheet type of self development-processing sensitized material in which a development pod of the film unit is crushed during development and discharged during driving, and developer is uniformly developed between a photosensitive layer and a transfer layer, so that a developing processing and a transfer processing are performed and whereby a positive image promptly appears.

The camera 1 is provided with a front cover 11, a back cover 12, and a battery chamber cover 13 which forms an appearance of the camera 1 together with the front cover 11 and the back cover 12. A camera main frame is provided inside the appearance defined by the front cover 11, the back cover 12 and the battery chamber cover 13.

On the front center of the camera 1, there is provided a lens barrel 20 having a cylindrical geometry, which is varied in its position with respect to a camera main frame between before the use of the camera and at the time of the use of the camera, the lens barrel 20 accommodating an image taking lens 21. Geometry of the lens barrel 20 is not restricted to a cylinder-shaped one, and it is acceptable that the geometry is an angular tube-shaped one. FIG. 1 shows a state that the lens barrel 20 is extended to a predetermined extension position. In the camera 1, the lens barrel 20 is extended from a predetermined collapsed position provided on the camera main frame so that photography is available when the camera offers the state as shown in FIG. 1. According to the camera 1, extension and collapse of the lens barrel 20 are performed by a manual operation, and thus there is no need to provide a driving mechanism necessary for extension and collapse of the lens barrel 20. Therefore, it is possible to realize the low price of the camera. Further, for the purpose of the user's convenience in a user's manual extension operation from the collapsed position, the top portion of the lens barrel 20 is provided with a finger stop 201. The finger stop 201 of the camera 1 is one projecting in a radius direction of the lens barrel 20 throughout the perimeter of the lens barrel 20. However, the finger stop 201 of the camera 1 is not restricted to this structure. It is acceptable that the finger stop 201 is one, which partially projects, recesses in opposite throughout the perimeter of the lens barrel 20, becomes hollow to meet figures of fingers, or is large in frictional resistance.

In the right side in the front of the camera 1 (the left side on FIG. 1), there is disposed a release button 30. According to the camera 1, when the release button 30 is depressed, the film unit is exposed with photographic light. Further, in the oblique upper of the release button 30, there is provided a flash 40 on the front of which a protector 41 is disposed. Furthermore, in the left side of the protector 41 (the right side on FIG. 1), there is provided a flash light receiving window 50 for introducing a flash light to a photo-electric element or a photocell (not illustrated) for receiving light quantity of the flash light reflected on a camera subject at the time of light emission of the flash. Still furthermore, the camera 1 is provided with a photometry section 60 for measuring brightness of field. On the flashlight receiving window 50, there is provided a light-receiving window 61 for introducing light to a built-in photometric element (not illustrated). The camera 1 is loaded with a reverse-Galilean finder. At the position adjacent to the flash 40, there is disposed a finder objective window 71. And at the back of the camera 1, there is disposed a finder eyepiece window 72.

At the right side of the camera 1, there is provided a strap through portion 14 through which a strap is passed.

On the top of the camera 1, there is provided a film unit discharge slot 80 for discharging a film unit subjected to the photography out of the camera 1. At the right side of the film unit discharge slot 80, there are provided an aperture set up dial 91 and four light-emitting devices 92. Hereinafter, the aperture set up dial 91 and four light-emitting devices 92 will be explained in conjunction with FIG. 2 together with FIG. 1.

Figure 2:
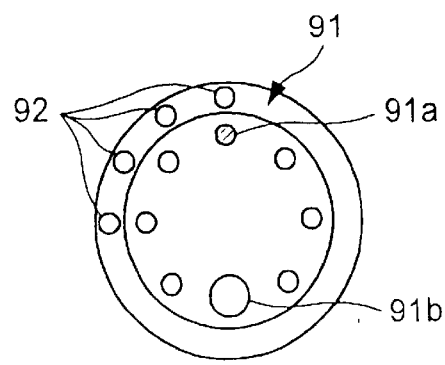
FIG. 2 is a plan view of an aperture set up dial and four light-emitting devices.

FIG. 2 is a plan view of an aperture set up dial and four light-emitting devices.

The aperture set up dial 91 is one of the controls that is to be operated by a user at the time of the use of the camera 1. The aperture set up dial 91 is provided with an index 91a and a cylindrical aperture dial rotating convex member 91b for the purpose of easy operation for a user, also in view of the design matter. Four light-emitting devices 92 are disposed on the periphery of the aperture set up dial 91 on an adjacent basis. The light-emitting devices 92 individually emit red light and green light. As will be described later, the aperture values of the camera 1 are selectable between four steps. The light-emitting devices 92 have a one-to-one correspondence with the aperture values. The aperture value of the camera 1 is set up by a mechanism, which will be described later, to an aperture value associated with the light-emitting device 92 to which the index 91a meets. When the photometry section 60 measures brightness of field, the light emitting device 92 associated with the aperture value corresponding to the measured brightness of field turns on a light with red to instruct a user to set up the aperture value. When the user adjusts the index 91a to the light-emitting device now turning on a light with red through the user's rotary operation of the aperture set up dial 91, the light-emitting device 92 now turning on a light with red is changed over to turning on a light with green, so that it is informed the user that the aperture value of the camera 1 is set up to the aperture value according to the brightness of field. According to the present embodiment, the use of the four light emitting devices 92 makes it possible to guide the operation of the aperture set up dial 91 by the user, so that the user can easily set up the aperture value. The four light-emitting devices 92 correspond to the instruction section referred to in the present invention.

Next, there will be described the internal structure of the camera 1 shown in FIG. 1.

First, there will be explained an outline of the internal structure of the camera 1.

Figure 3:
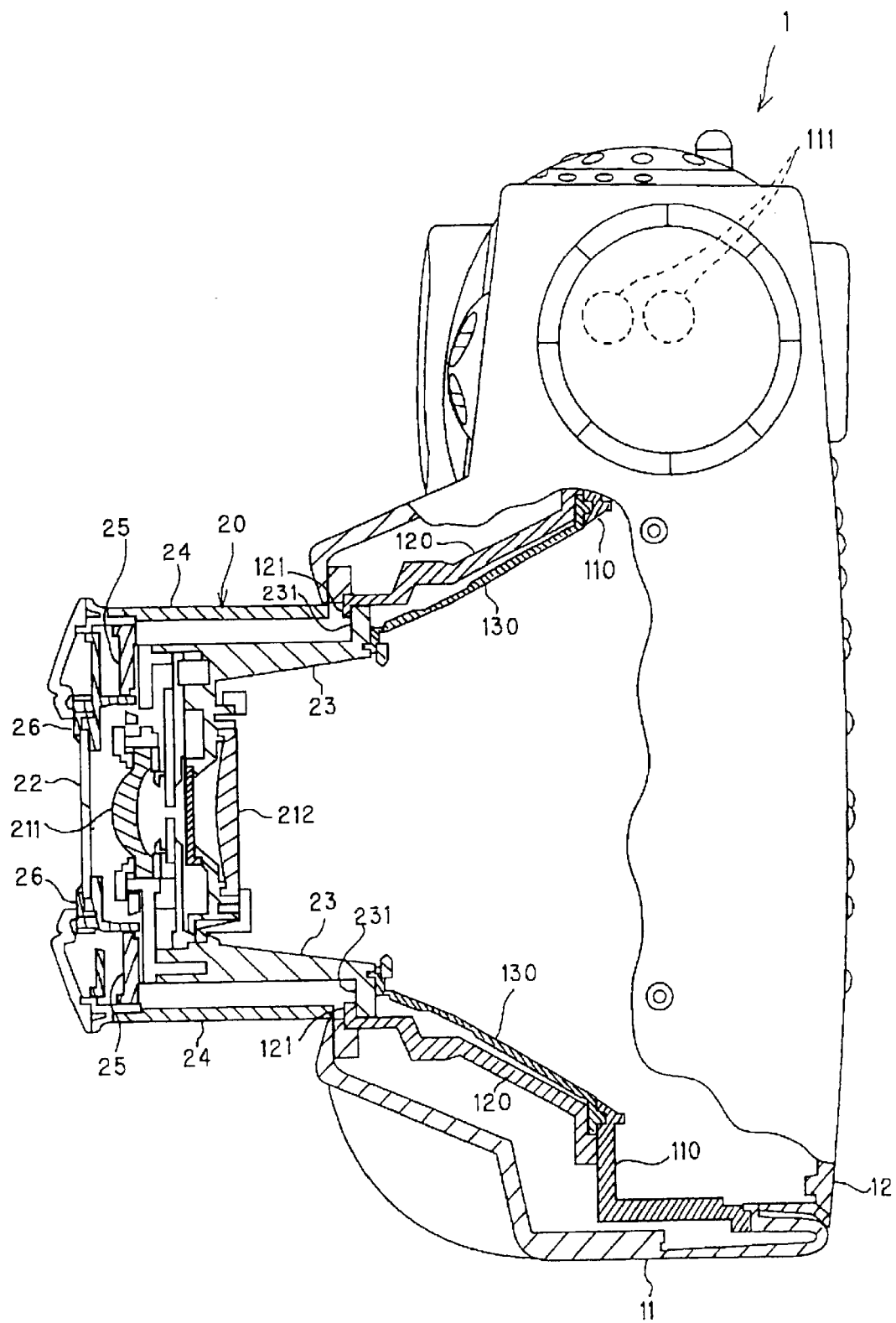
FIG. 3 is a partially sectional view of the camera in a state that a lens barrel is extended to a predetermined extension position, in which a left side of the camera is partially broken.

FIG. 3 is a partially sectional view of the camera in a state that a lens barrel is extended to a predetermined extension position, in which a left side of the camera is partially broken.

The main frame of the camera 1 comprises a main body 110 and a fixed barrel 120 for accommodating the collapsed lens barrel 20. On the lens barrel 20, as the image taking lens, a first image taking lens 211 and a second image taking lens 212 are supported. In front of the first image taking lens 211, there is disposed a lens barrier 22 which opens and shuts selectively. The lens barrel 20 further comprises a shutter base 23 on which shutter blades and the like are mounted, an outer cylinder 24 covering the periphery of the shutter base 23, a barrier ring 25 disposed in front of the shutter base 23, and a barrier base 26 disposed in front of the barrier ring 25. The shutter base 23, the outer cylinder 24, the barrier ring 25 and the barrier base 26 are collapsed and extended in one united body. The camera 1 is provided with a rubber bellows 130 for shielding the light, which couples the shutter base 23 and the main body 110. Thus, it is possible to prevent incidence of light different from the photographic light. Further, the main body 110 is provided with two developing rollers 111 as shown with a dotted line. The developing rollers 111 hold therebetween the film unit subjected to the exposure and discharge the same out of the camera 1. With respect to the film unit held by the developing rollers 111, a development pod of the film unit is crushed, and developer is uniformly developed between a photosensitive layer and a transfer layer, so that a developing processing and a transfer processing are performed.

Next, there will be explained collapse and extension of the lens barrel in conjunction with FIG. 4 and FIG. 5 together with FIG. 3.

Figure 4:
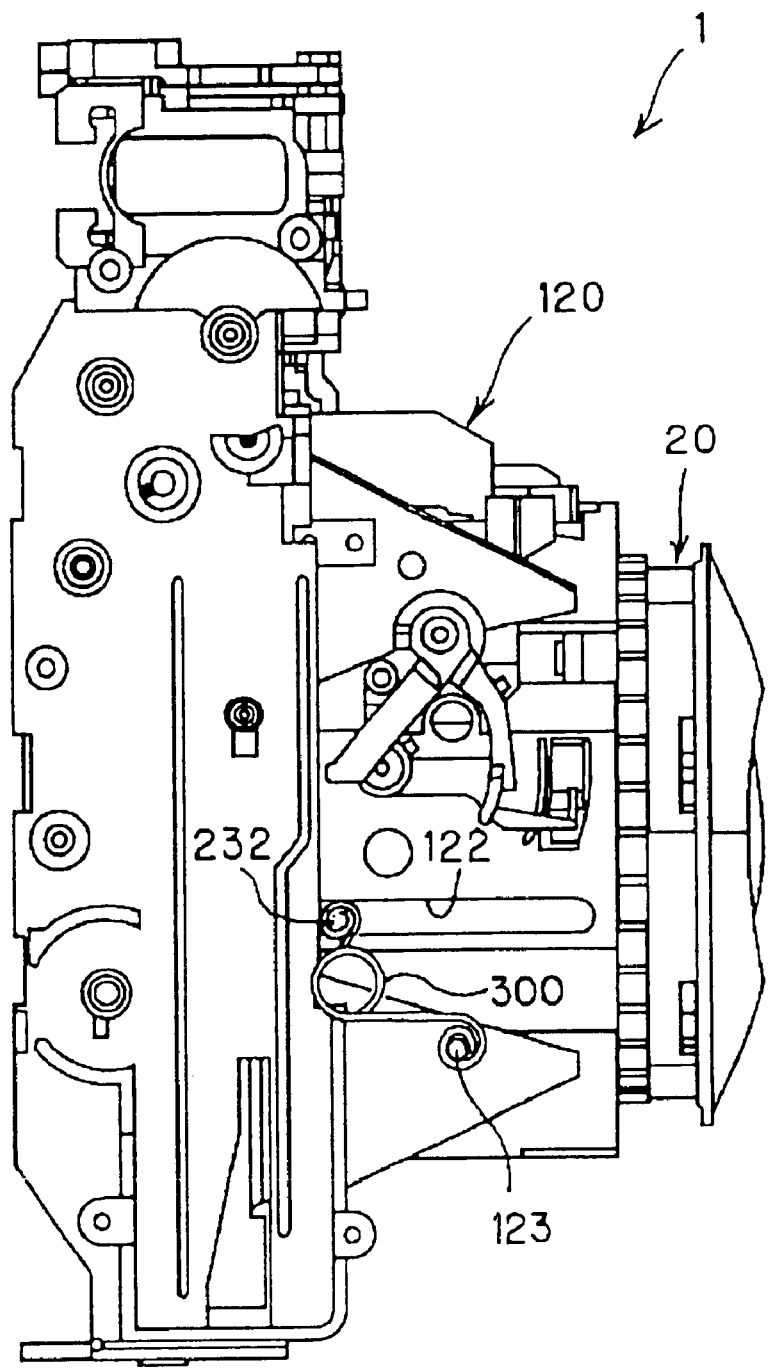
FIG. 4 is a view of a right side of the camera in a state that a lens barrel is collapsed to a predetermined collapse position.
Figure 5:
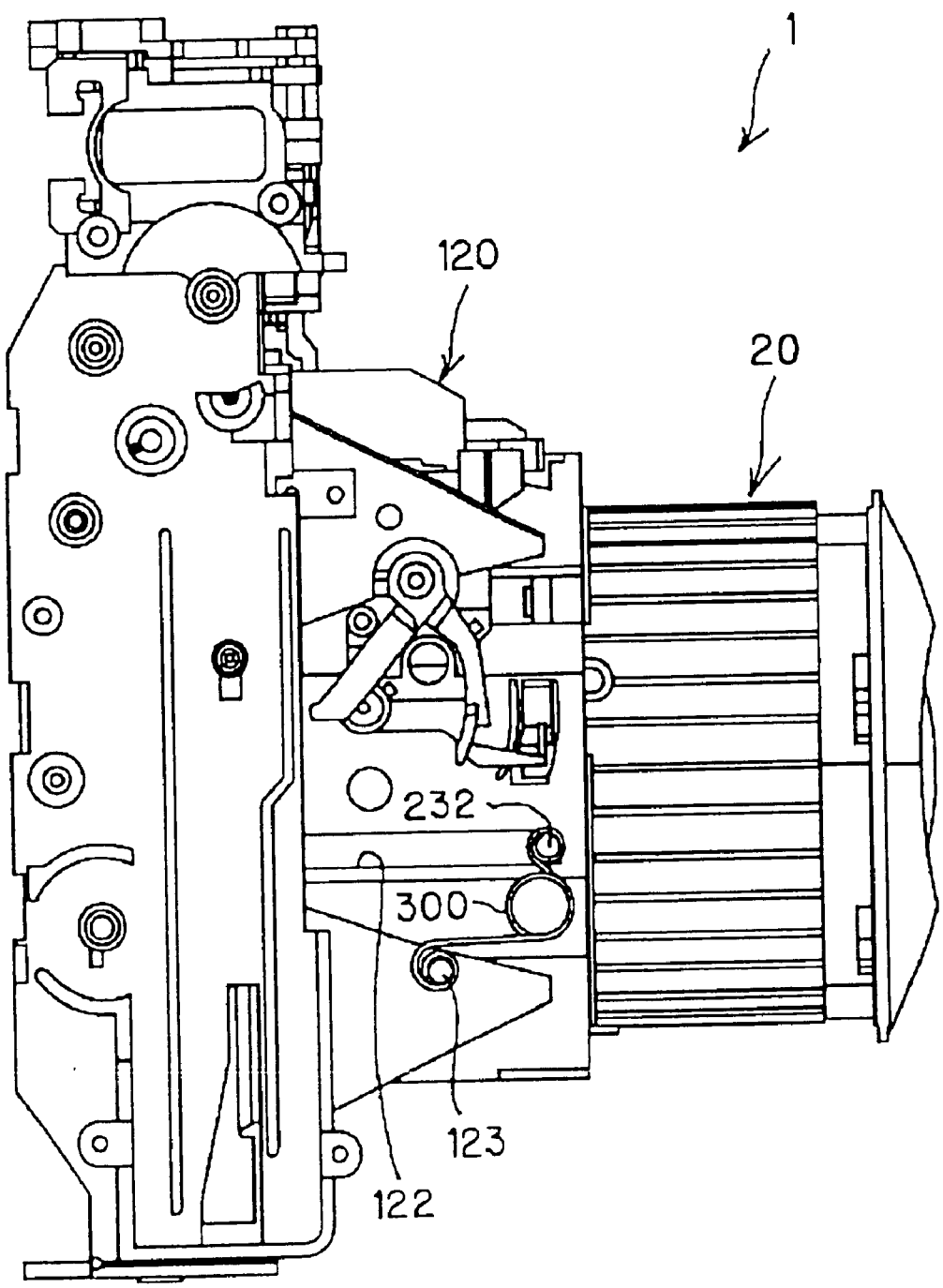
FIG. 5 is a view of a right side of the camera in a state that a lens barrel is extended to a predetermined extension position.

FIG. 4 is a view of a right side of the camera in a state that a lens barrel is collapsed to a predetermined collapse position. FIG. 5 is a view of a right side of the camera in a state that a lens barrel is extended to a predetermined extension position. In the cameras shown in any of the figures, the front cover, the back cover and the battery chamber cover are removed.

When the lens barrel 20 is collapsed, the shutter base 23 shown in FIG. 3 is received by the main body 110 through a rubber bellows 130 so that the lens barrel 20 is positioned at a predetermined collapse position (cf. FIG. 4). On the other hand, when the lens barrel 20 is extended, a rear end 231 of the shutter base 23 shown in FIG. 3 is in contact with a top end 121 of the fixed barrel 120, so that the lens barrel 20 is positioned at a predetermined extension position (cf. FIG. 3 and FIG. 5). Therefore, it is possible for any one through a manual operation to extend the lens barrel 20 to the extension position or to collapse the lens barrel 20 to the collapse position.

On the periphery of the shutter base 23 shown in FIG. 3, there are provided two stopper projections 232 (FIG. 4 and FIG. 5) in a peripheral direction of the shutter base at intervals of 180°. On the other hand, on the periphery of the fixed barrel 120, as shown in FIG. 4 and FIG. 5, there are provided a long hole 122 extending in an extension direction of the lens barrel 20 and a stopper projection 123 projecting toward the outside. The long hole 122 is provided at a position to meet a position on which the stopper projection 232 of the shutter base 23 projects. The stopper projection 232 of the shutter base 23 is inserted into the long hole 122. The stopper projection 123 of the fixed barrel 120 is provided in the vicinity of the middle of the long hole 122. Those stopper projections 232 and 123 stop the edges of a toggle spring 300, respectively. While FIG. 4 and FIG. 5 show only one toggle spring 300, it is noted that the camera 1 is provided with another toggle 300 located at the opposite position to the position of the illustrated toggle spring 300 of the shutter base 23. The lens barrel 20 is enabled by the toggle springs 300, when it is located in the vicinity of the extension position, toward the extension position, and when it is located in the vicinity of the collapse position, toward the collapse position. Consequently, when the toggle springs 300 are used to extend the lens barrel 20 to the vicinity of the extension position or collapse the lens barrel 20 to the vicinity of the collapse position, the enabling force to the operational direction is added. Thus, it is possible to improve operability. Further, according to the present embodiment, two toggle springs 300 are provided at intervals of 180°. This feature makes it possible to prevent the lens barrel 20 from slanting or being caught by the fixed barrel 120 in the extension operation and the collapse operation for the lens barrel 20. Further, the rubber bellows 130 shown in FIG. 3 also serves to enable the lens barrel 20 to the extension position in the manual extension operation for the lens barrel 20, and thereby improving operability. Here, there will be explained the rubber bellows with reference to FIG. 6.

Figure 6A:
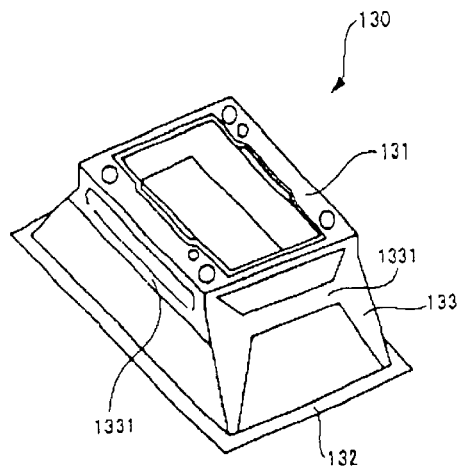
FIGS. 6(a)–6(c) are perspective views showing three states of a rubber bellows, respectively.
Figure 6B:
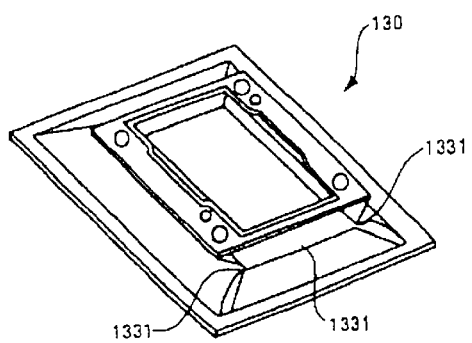
Figure 6C:
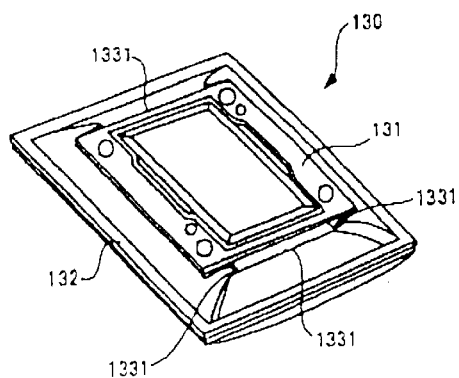

FIGS. 6(a)–6(c) are perspective views showing three states of a rubber bellows, respectively.

FIG. 6(a) is a perspective view of the rubber bellows wherein the lens barrel is extended to a predetermined extension position. FIG. 6(b) is a perspective view of the rubber bellows wherein the lens barrel is located between a predetermined extension position and a predetermined collapse position. FIG. 6(c) is a perspective view of the rubber bellows wherein the lens barrel is collapsed to a predetermined collapse position.

When the lens barrel is extended to a predetermined extension position, the rubber bellows 130 are completely extended and the geometry at that time offers a frustum of pyramid-like shaped one as shown in FIG. 6(a). The rubber bellows 130 has openings at the front 131 and the back 132, respectively, and as shown in FIG. 3. The front periphery of the rubber bellows 130 is fixed on the shutter base 23, and the back periphery of the rubber bellows 130 is fixed on the main body 110. Further, as shown in FIG. 6(a), a periphery 133 coupling the front periphery and the back periphery, of the rubber bellows 130, is provided with a recess 1331 in the peripheral direction of the periphery 133. The portion, on which the recess 1331 is provided, of the periphery 133 is thinner than the remaining portion of the periphery 133. The periphery 133 of the rubber bellows 130 is folded by the recess 1331, as the lens barrel changes over from the extension state to the collapse state, and through the state as shown in FIG. 6(b), when the lens barrel collapses to a predetermined collapse position, the lens barrel is completely folded as shown in FIG. 6(c). The rubber bellows 130 shown in FIG. 6(c) is in a state that the front 131 enters downward in the figure over the back 132 and is turned over. When the rubber bellows 130 is turned over, there is no enabling force of the rubber bellows 130 for enabling the lens barrel 20 toward the extension position.

Next, there will be explained the internal structure of the camera 1 more in detail in conjunction with FIG. 7.

Figure 7:
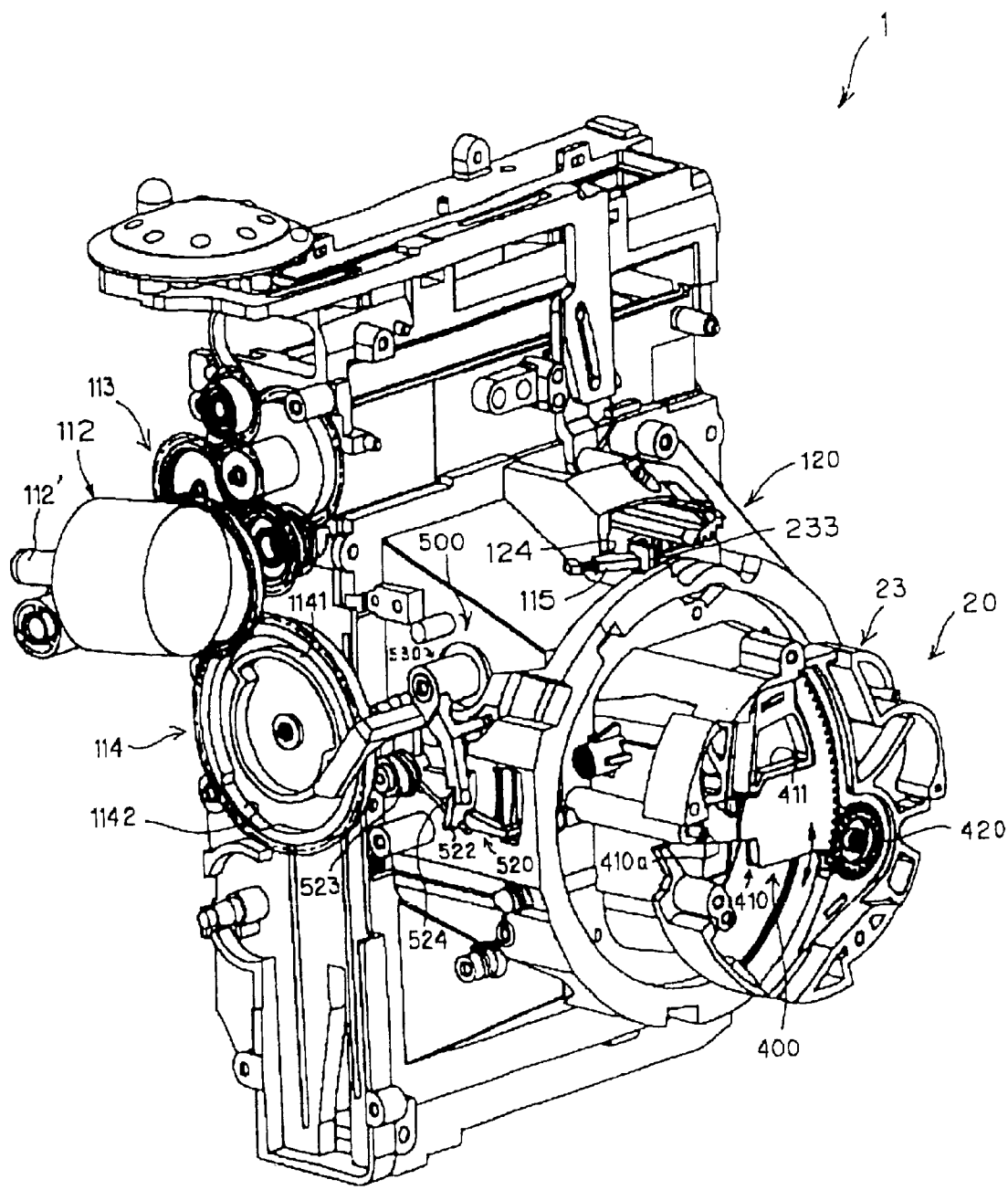
FIG. 7 is a perspective view of a camera in which a lens barrel is extended to a predetermined extension position.

FIG. 7 is a perspective view of a camera in which a lens barrel is extended to a predetermined extension position. Incidentally, in the camera shown in FIG. 7, the front cover, the rear cover and the battery chamber cover are removed, and further, the outer barrel and the like are removed so that the shutter appears looking from the lens barrel.

The camera 1 is provided with a main power switch 115 on a peripheral wall of the fixed barrel 120. The main power switch 115 is a contact switch having a fixed electrode not varied and a flexible electrode, which is flexible with respect to the fixed electrode. Details of the structure of the contact switch will be described later. On the periphery of the shutter base 23, there is provided a projection piece 233 projecting outwards. On the peripheral wall of the fixed barrel 120, there is provided a breaking hole 124 extending in the extension direction of the lens barrel 20. The projection piece 233 of the shutter base 23 is inserted into the breaking hole 124. A projecting end of the projection piece 233 projects from the peripheral wall of the fixed barrel 120.

When the lens barrel 20 collapses at the collapse position, the projecting end projecting from the fixed barrel 120, of the projection piece 233 is located backwards of the main power switch 115, so that the main power switch 115 turns off. On the other hand, when the extension operation of the lens barrel 20 is performed, the projecting end of the projection piece 233 advances from the back of the main power switch 115 to the main power switch 115 as the extension operation is performed. When the lens barrel 20 is extended to the extension position, the main power switch 115 is pushed by the projecting end of the projection piece 233 as shown in FIG. 7, so that the flexible electrode is in contact with the fixed electrode, whereby the main power switch 115 turns on. In other words, according to the camera 1, the extension operation of the lens barrel 20 causes the main power switch 115 turns on, and the collapse operation of the lens barrel 20 causes the main power switch 115 turns off. Thus, the operation of the camera is simplified, and also it is possible to prevent a waste of the battery due to forgetting to turn off the main power switch 115.

Next, there will be explained a shutter provided on the camera 1 in conjunction with FIG. 7. A shutter 400 is disposed on the lens barrel 20 and is provided with a shutter blade 410 and a gear 420.

The shutter blade 410 performs open and shut operation in the shutter base 23 on a rotary shaft 410a so that an internal film unit (not illustrated) is exposed with a photographic light. The open and shut operation forms a shutter operation of the camera 1. The shutter blade 410 is enabled so that it is closed by a spring (not illustrated). The shutter blade 410 shown in FIG. 7 is in a state that it is closed. The shutter blade 410 rotates in a clockwise direction on the rotary shaft 410a opposing to enabling by a spring (not illustrated), so that an aperture 411 is positioned at an incident path of the photographic light to expose the film unit with the photographic light. Thereafter, the shutter blade 410, which rotates in a clockwise direction, rotate in the opposite direction by the enabling force by a spring (not illustrated) and then returns to the state that it is closed. A gear 420 is provided in the front of the shutter base 23. The shutter blade 410 is engaged with the gear 420. This engagement serves to limit the switching speed of the shutter blade 410. The engagement is of a governor mechanism. According to the present embodiment, when the shutter blade 410 is opened, the opening speed of the shutter blade 410 is decrease by the governor mechanism and the enabling force of the spring that enables the shutter blade 410. Thus, according to the present embodiment, it is possible to prevent harmful effects caused by the fact that the opening speed of the shutter blade is too fast.

Next, there will be described members provided inside the camera main body more in detail in conjunction with FIG. 8 together with FIG. 7.

Figure 8:
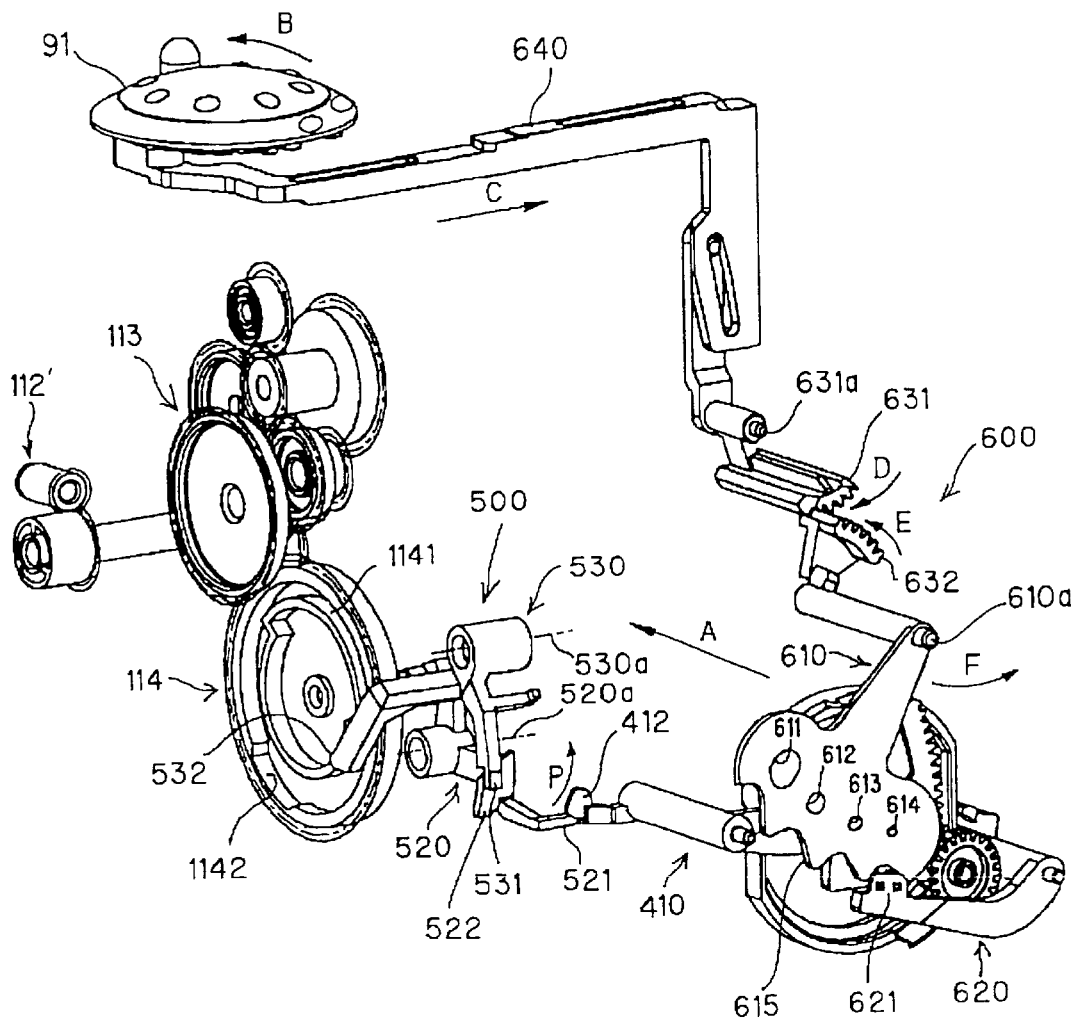
FIG. 8 is a perspective view showing a part of an internal structure of a camera in which a lens barrel is extended to a predetermined extension position.

FIG. 8 is a perspective view showing a part of an internal structure of a camera in which a lens barrel is extended to a predetermined extension position.

A camera main body is provided with a motor 112. FIG. 8 shows a rotary shaft 112' of the motor 112. The camera main body is further provided with a reduction gear 113 and a cam gear 114 as a rotary cam.

The motor 112 starts the rotation when the release button 30 is depressed. The rotary driving force is transmitted via the reduction gear 113 to the cam gear 114 and the developing roller 111 shown in FIG. 3 as well.

The cam gear 114 rotates in a one direction by the rotary driving force of the motor 112. On a surface of the cam gear 114, there is provided a first cam plane 1141 in the periphery direction. On the out side of the first cam plane 1141, there is provided a second cam plane 1142 in the periphery direction.

Further, at the rear end of the shutter blade 410, as shown in FIG. 8, there is provided a flange 412. According to the camera 1, a shutter charge mechanism, which will be explained hereinafter in conjunction with FIG. 7 and FIG. 8, is used to kick the flange 412 and thereby opening the shutter blade 410.

A shutter charge mechanism 500, which is provided on the camera 1, is disposed on the camera main body as shown in FIG. 7. The shutter charge mechanism 500 has a charge lever 520 and a set lever 530.

In FIG. 8, the top end 521 of the charge lever 520 is coupled to the flange 412 of the shutter blade 410. However, FIG. 8 is a perspective view showing a part of an internal structure of a camera in which a lens barrel is extended to a predetermined extension position. The lens barrel is capable of collapsing in an optical axis direction (cf. an arrow A in FIG. 8). The top portion 521 of the charge lever 520 is coupled with the flange 412 of the shutter blade 410 only when the lens barrel 20 is extended to a predetermined extension position. The charge lever 520 rotates on a rotary shaft 520a shown in FIG. 8. On the middle of the charge lever 520, there is provided a contact plane 522 with which the top 531 of the set lever 530 contacts. The rear end of the charge lever 520 is located at the back of the cam gear 114. While FIG. 8 omits it, as shown in FIG. 7, engaged with a bearing 523 of the rotary shaft of the charge lever 520 is a spring 524 for enabling the charge lever 520 in a direction (upper FIG. 7 and FIG. 8) in which the top end of the charge lever 520 kicks the flange of the shutter blade 410. One end of the spring 524 is stopped on the contact plane 522. The charge lever 520 kicks the flange 412 of the shutter blade 410 by the enabling force of the spring 524 so that the shutter 400 performs the shutter operation. According to the present embodiment, the use of the coupling mechanism of the top end 521 and the flange 412, which are coupled only at the time of the extension, makes it possible to prevent the film unit from being exposed by photographic light even if the release button 30 is erroneously depressed when the lens barrel 20 is collapsed.

The set lever 530 rotates on a rotary shaft 530a shown in FIG. 8, and has at the rear end a cam follower 532 that contacts with the first cam plane 1141. Further, as mentioned above, the top 531 of the set lever 530 is in contact with the contact plane 522 of the charge lever 520. The set lever 530 is enabled in a direction (downwards in FIG. 7 and FIG. 8) opposite to the enabling direction of the charge lever 520 by a spring (not illustrated) having a larger enabling force than the spring (cf. FIG. 7) that enables the charge lever 520. Also the cam follower 532 is enabled to the first cam plane 1141. FIG. 8 shows a state that the set lever 530 prevents the top end 521 of the charge lever 520 from kicking the flange 412 of the shutter blade 410 by the enabling force of the spring 524 shown in FIG. 7.

Next, there will be described an aperture member 600 in conjunction with FIG. 8 and FIG. 9.

Figure 9:
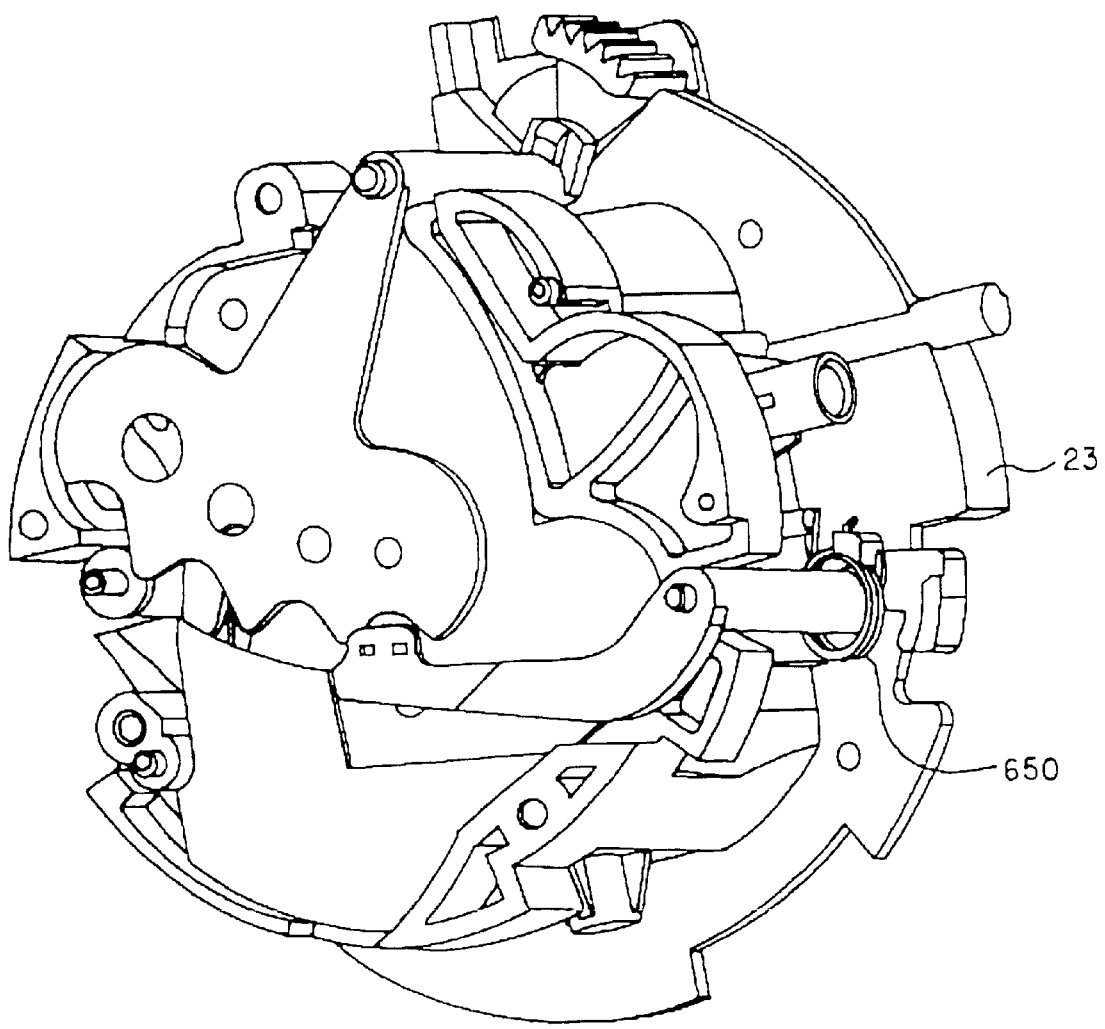
FIG. 9 is a perspective view showing a shutter base in a state that a fixed barrel is removed.

FIG. 9 is a perspective view showing a shutter base in a state that a fixed barrel is removed.

The aperture member 600 is provided with an aperture plate 610, a click lever 620, two coupling gears 631 and 632 engaged with one another, a handler 640 coupling to the aperture set up dial 91, and a click lever enabling spring 650 shown in FIG. 9. The aperture plate 610 is disposed in front of the shutter blade 410. The aperture plate 610 is provided with four openings 611, 612, 613 and 614, which are different from one another in size. More in detail, the aperture plate 610 is provided with the largest opening 611 at the left side in FIG. 8, and the smaller openings 612, 613 and 614 going toward the right side in the named order. The aperture plate 610 is enabled by an aperture plate enabling spring not illustrated in FIG. 8 in a direction counterclockwise in FIG. 8. Further, the aperture plate 610 is provided with a sawtooth-like shaped engaging member 615, which is engaged with the top end 621 of the click lever 620. The top end 621 of the click lever 620 is enabled toward the side of the aperture plate 610 by the click lever enabling spring 650 stopped on the shutter base 23 shown in FIG. 9. However, the aperture plate 610 rotates on a rotary shaft 610a, in response to a rotary operation of the aperture set up dial 91, opposing to the engagement force of the top end 621 of the click lever 620. Further, in the event that the aperture plate 610 receives a rotary operation of the aperture set up dial 91, which serves to increase the aperture value, the aperture plate 610 rotates also opposing to the enabling force by the aperture plate enabling spring for enabling the aperture plate 610 per se. That is, upon receipt of the operation of the aperture set up dial 91, the handler 640 is pushed or drawn. This causes the coupling gear 631 at the side of the aperture set up dial 91 to swing on a shaft 631a. Then, the coupling gear 632 at the side of the aperture plate 610 also swings on the rotary shaft 610a and the aperture plate 610 rotates. For example, as shown in FIG. 8 with arrows, when the aperture set up dial 91 is rotated counterclockwise (cf. an arrow B), the handler 640 is pushed toward the right side of FIG. 8 (cf. an arrow C), so that the coupling gear 631 at the side of the aperture set up dial 91 swings on the shaft 631a clockwise (cf. an arrow D). As a result, the coupling gear 632 at the side of the aperture plate 610 swings on the rotary shaft 610a counterclockwise (cf. an arrow E) and the aperture plate 610 rotates also counterclockwise (cf. an arrow F). In this manner, upon receipt of the operation of the aperture set up dial 91, the aperture plate 610 is set up to any one of four aperture values according to the size of the openings 611, 612, 613 and 614. Accordingly, as compared with a camera in which the aperture value is automatically set up, it is possible to reduce the cost of the camera. A member, which comprises two coupling gears 631 and 632 mutually engaged with one another and the handler 640, corresponds to the coupling member referred to in the present invention.

Further, there will be explained the aperture member 600 in conjunction with FIG. 10.

Figure 10:
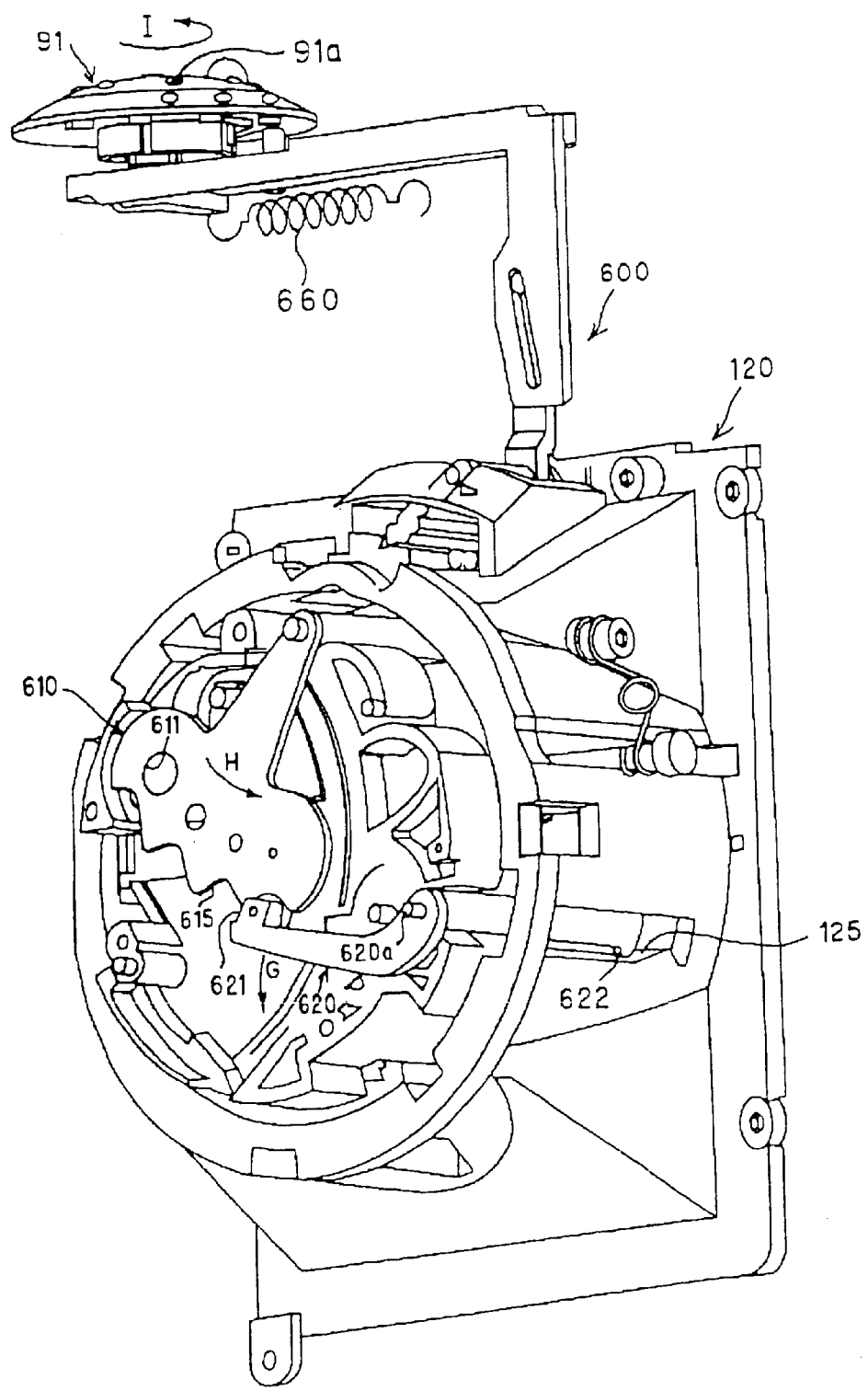
FIG. 10 is a perspective view showing a fixed barrel and an aperture member in half way of collapse of a lens barrel.

FIG. 10 is a perspective view showing a fixed barrel and an aperture member in half way of collapse of a lens barrel.

While FIG. 8 omits it, the aperture member 600 has an aperture plate enabling spring 660 one end of which is stopped on the handler 640 and another stopped on the side of the camera main body. The aperture plate 610 is enabled by the aperture plate enabling spring 660 in a direction that the largest opening 611 is located at the incident path of the photographic light. The click lever 620 of the aperture member 600 rotates on the rotary shaft 620a. When the collapse operation of the lens barrel is performed, the rear end 622 of the click lever 620 runs on to an inclined plane 125 provided on the fixed barrel 120 in half way of the collapse operation, and rotates on the rotary shaft 620a as in an arrow G shown in FIG. 10 opposing to the enabling force of the click lever enabling spring 650 shown in FIG. 9 for enabling the click lever 620, so that the top end 621 of the click lever 620 is disengaged from the engaging member 615 of the aperture plate 610. Then, the aperture plate 610 rotates (cf. an arrow H) by the enabling force of the aperture plate enabling spring 660 enabling the aperture plate 610 per se, in such a manner that the largest opening 611 is located at the incident path of the photographic light, so that the aperture plate 610 returns to the aperture value according to the largest opening 611 and the aperture set up dial 91 also rotates (cf. an arrow I) in such a manner that the index 91a meets the position of the light-emitting device associated with the aperture value of the largest opening 611. When the lens barrel 20 collapses to a predetermined collapse position, the rear end 622 of the click lever 620 drops from the inclined plane 125 of the fixed barrel 120, and the top end 621 of the click lever 620 is again engaged with the engaging member 615 of the aperture plate 610 by the enabling force of the click lever enabling spring 650 shown in FIG. 9 enabling the click lever 620.

It often happens that such a type of camera as the camera 1 is used overwhelmingly indoors. The aperture value according to the largest opening 611 is an aperture value optimum to an indoor photography of the aperture values of the camera 1. According to the present embodiment, since the aperture set up dial 91 is manually rotated so that the aperture value is changed over, it is possible to reduce troublesomeness of the operation of the aperture set up dial 91 by a user by means of returning the aperture plate 610 to the aperture value according to the largest opening 611, and in addition it is possible to reduce failure in photography due to forgetting set up of the aperture value. In contrast to the camera 1, in such a type of camera which is used overwhelmingly outdoors, it is preferable that the aperture plate 610 is returned to the aperture value according to the smallest opening 614. Alternatively, in such a type of camera that it is used half-and-half indoors and outdoors, it is preferable that the aperture plate 610 is returned to the aperture value according to the middle size of openings. According to the camera 1, to return the aperture plate 610 to the aperture value according to the largest opening 611, the collapse operation of the lens barrel 20 is utilized. This feature makes it possible to prevent the aperture value from being set up to the aperture value of the largest opening 611 owing to carelessness in photography.

According to the camera 1 of the present embodiment, as shown in FIG. 8, the coupling gear 631 at the side of the aperture set up dial 91 is long not so as to disengage the coupling gear 631 with the coupling gear 632 by any operation of the extension and the collapse of the lens barrel 20. However, a camera according to the present invention is not restricted to the present embodiment, and it is acceptable that the coupling gear 632 at the side of the aperture plate 610 is long, or alternatively it is acceptable that both the coupling gears 631 and 632 are long.

Next, there will be explained a lens barrier in conjunction with FIG. 11 and FIG. 12.

Figure 11:
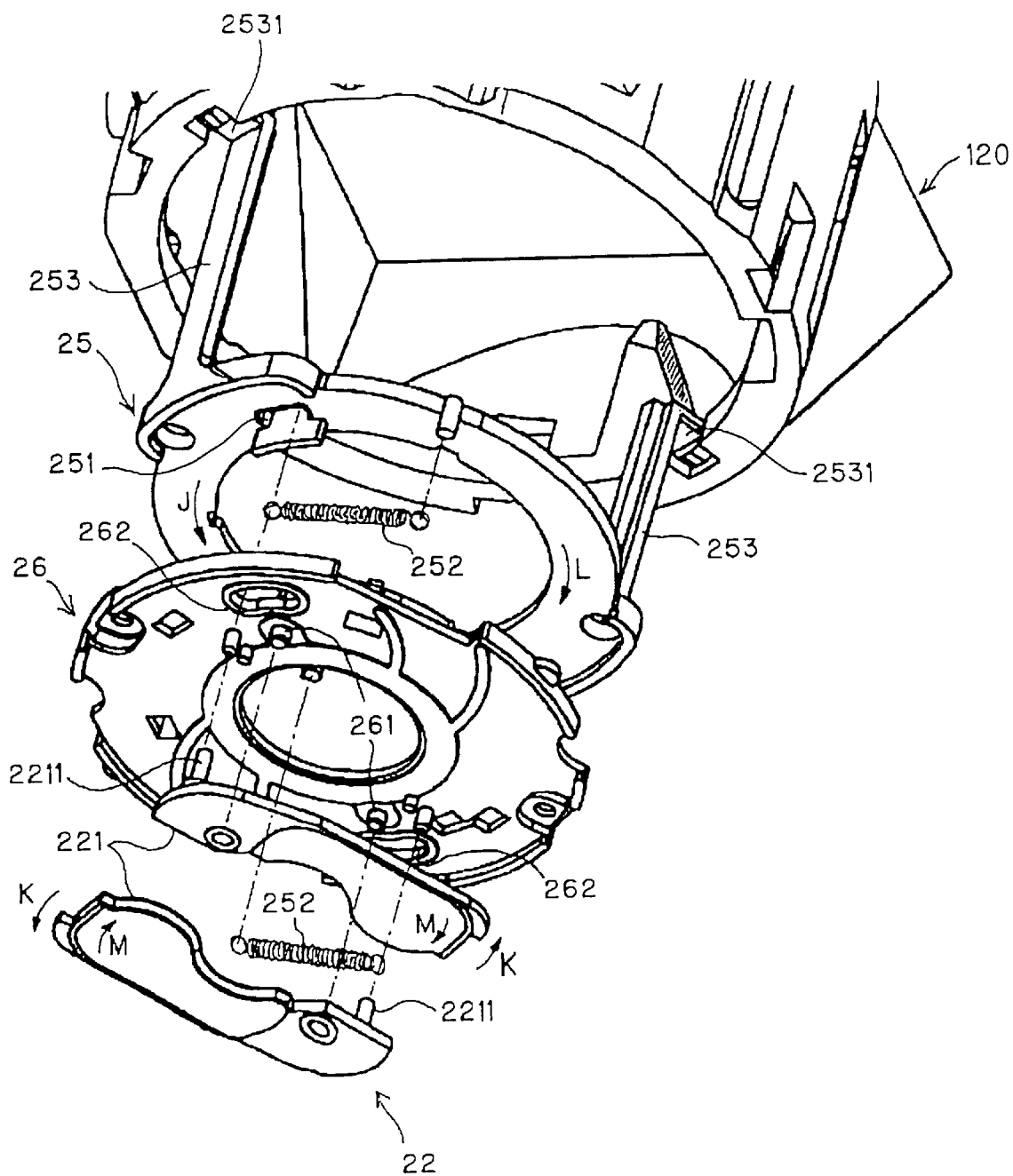
FIG. 11 is an exploded perspective view of a part of a lens barrel in which a shutter base and an external barrel are removed.
Figure 12:
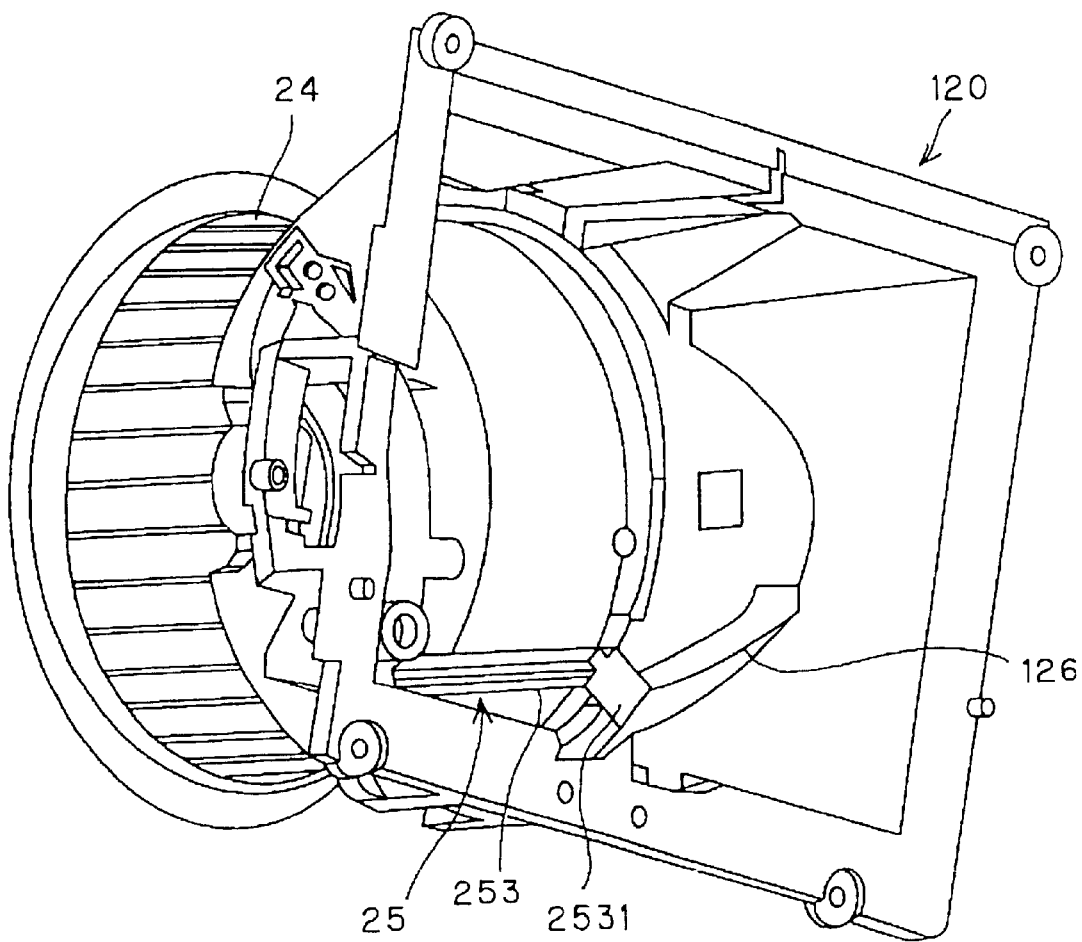
FIG. 12 is a perspective view of a lens barrel extended to a predetermined extension position, looking from a side of a camera body in a state that a shutter base is removed.

FIG. 11 is an exploded perspective view of a part of a lens barrel in which a shutter base and an external barrel are removed. FIG. 12 is a perspective view of a lens barrel extended to a predetermined extension position, looking from a side of a camera body in a state that a shutter base is removed.

A lens barrier 22 shown in FIG. 11 is provided with two blade members 221. The two blade members 221 are pivotally mounted on the barrier base 26. The barrier base 26 is provided with two pins 261 on which the two blade members 221 are rotatable, respectively. The respective blade member 221 rotates on the associated pin 261. The two blade members 221 are also provided with two sliding pins 2211, respectively. The barrier base 26 has two insertion holes 262 through which the two sliding pins 2211 are inserted, respectively, in a peripheral direction. Also the barrier ring has two insertion holes 251 through which the two sliding pins 2211 are inserted, respectively, in the peripheral direction. One end of the coil spring 252 is stopped on the barrier ring 25. Another end of the coil spring 252 is stopped on the top portion of the sliding pin 2211, which is inserted via the insertion hole 262 of the barrier base 26 into the insertion hole 251 of the barrier base 25. The barrier ring 25 has two sliders 253. Each of the sliders 253 is provided with a sliding member 2531. The inner wall of the fixed barrel 120 shown in FIG. 12 is provided with projecting guide walls 126 each guiding the associated sliding member 2531. The slider 253 is positioned at the inner wall plane of the fixed barrel 120. The sliding member 2531 is in contact with the guide wall 126. Accordingly, the barrier ring 25 rotates by the extension operation and the collapse operation of the lens barrel and moves in the moving direction of the lens barrel. On the other hand, the barrier base 26 shown in FIG. 11 is fixed on the outer barrel 24 shown in FIG. 12 and is not rotatable. Thus, as shown in FIG. 11, when the lens barrel is extended so that the barrier ring 25 rotates counterclockwise (cf. an arrow J), the two blade members 221 also rotate counterclockwise (cf. an arrow K) on the pins 261, respectively and thus the lens barrier 22 is opened. On the other hand, when the lens barrel is collapsed so that the barrier ring 25 rotates clockwise (cf. an arrow L), the two blade members 221 also rotate clockwise (cf. an arrow M), respectively and thus the lens barrier 22 is closed. In this manner, according to the present embodiment, the collapse and the extension of the lens barrel by the manual operation are utilized to perform open and close operations for the lens barrier 22. The coil spring 252 serves to enable the lens barrier 22 to be closed and prevents the lens barrier from being inadvertently opened in the state that the lens barrel is collapsed at the collapse position.

Further, there will be described in detail members provided in the vicinity of the cam gear 114 in conjunction with FIG. 13 and FIG. 14.

Figure 13:
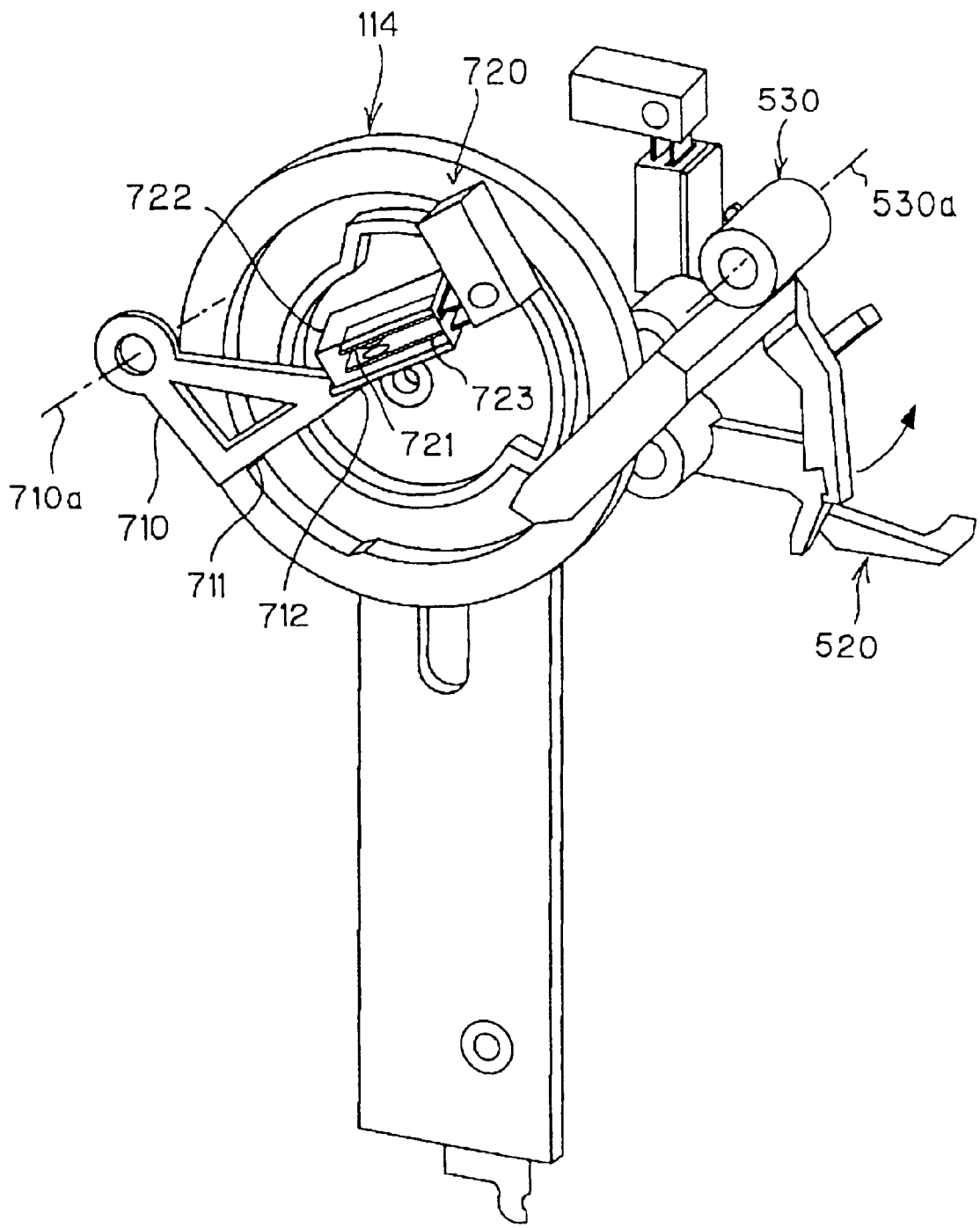
FIG. 13 is a perspective view of a cam gear and members provided in the vicinity of the cam gear, looking from a side of the surface of the cam gear.

FIG. 13 is a perspective view of a cam gear and members provided in the vicinity of the cam gear, looking from a side of the surface of the cam gear. FIG. 14 is a perspective view of a cam gear and members provided in the vicinity of the cam gear, looking from a side of the back of the cam gear.

As shown in FIG. 13, in the vicinity of the surface of the cam gear 114, there are provided a cam switch lever 710 and a cam switch 720 as well as the set lever 530.

The cam switch lever 710 rotates on a rotary shaft 710a. On the middle of the cam switch lever 710, there is provided a cam follower 711 contacting with the second cam plane 1142. On the top of the cam switch lever 710, there is provided a contact 712 contacting with the cam switch 720.

The cam switch 720 is a contact switch having the same structure as the above-mentioned main power switch 115. The cam switch 720 has a non-deformation of fixed electrode 721 and a flexible electrode 723 fixed on a casing 722, as shown in FIG. 13. The flexible electrode 723 is bent with respect to the fixed electrode 721 when the external force pushes the casing 722. When the flexible electrode 723 contacts with the fixed electrode 721, the cam switch 720 turns on. When the external force is released, the flexible electrode 723 is separated from the fixed electrode 721 by the elastic force, so that the cam switch 720 turns off. A control unit (not illustrated) of the camera 1 detects the fact that the cam switch 720 changes from the state of the turn-on to the state of the turn-off, and stops the rotation of the motor 112 shown in FIG. 7, so that the rotation of the cam gear 114 is terminated and the rotary driving of the developing roller 111 shown in FIG. 3 is stopped. Incidentally, as mentioned above, the start of rotation of the motor 112 is performed in accordance with the operation of the release switch 30, and has no connection with the fact that the cam switch 720 turns on.

Figure 14:
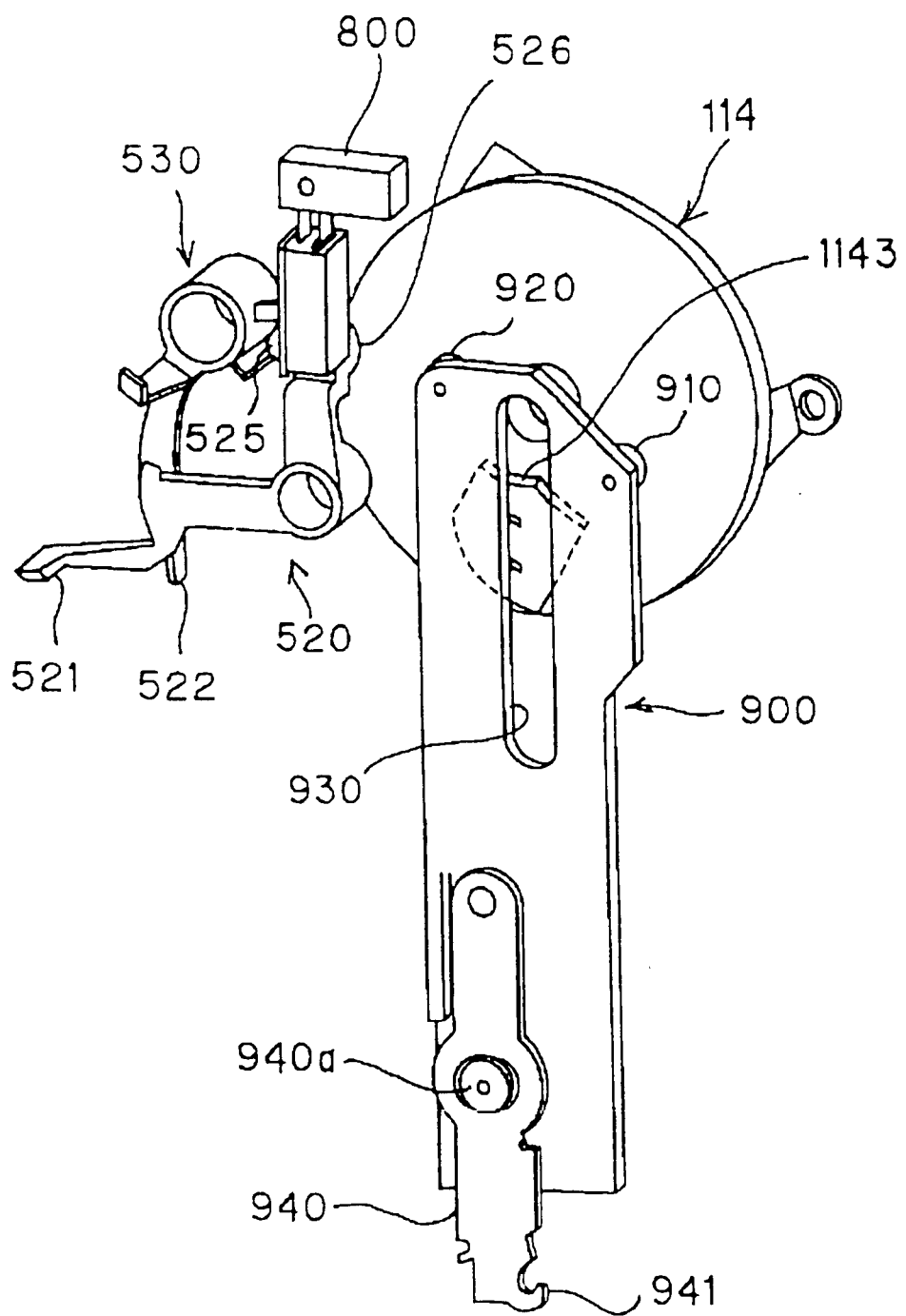
FIG. 14 is a perspective view of a cam gear and members provided in the vicinity of the cam gear, looking from a side of the back of the cam gear.

On the other hand, as shown in FIG. 14, the cam member 1143 is provided in the back of the cam gear 114, and in the vicinity of the back of the cam gear 114 there are provided a synchronizing switch 800 and a holding plate 900 as well as the charge lever 520.

The charge lever 520 has, as mentioned above, the top end 521 coupled to the flange 412 of the shutter blade, and the contact plane 522 with which the top of the set lever 530 contacts, and in addition a pin 525 pushing the synchronizing switch 800 as the charge lever 520 rotates, and a cam follower 526 contacting with the cam member 1143 as the cam gear 114 rotates, in the rear end located at the back of the cam gear 114.

The synchronizing switch 800 is a contact switch having the same structure as the above-mentioned cam switch 720. When the synchronizing switch 800 is changed from the state of the turn-off to the state of the turn-on, the synchronizing switch 800 instructs the control unit (not illustrated) to perform the light emission of the flash 40. As shown in FIG. 1, the flash 40 of the camera 1 is provided in front of the camera 1. Thus, the provision of the synchronizing switch 800 in the vicinity of the cam gear 114 provided on the camera main frame makes it possible to reduce wiring. With respect to the control unit not illustrated, in the event that brightness of field measured by the photometry 60 is not less than a predetermined threshold, even if the control unit receives an instruction of the flash light emission from the synchronizing switch 800, the control unit prohibits the light emission of the flash 40. In the event that brightness of field measured by the photometry 60 is less than the predetermined threshold, the control unit permits the light emission of the flash 40 in accordance with the instruction of the flash light emission, and stops the light emission of the flash 40 in accordance with a quantity of flash light reflected on the subject and returned through a flash light receiving window 42.

The holding plate 900 has a first cam follower 910, a second cam follower 920, a long hole 930 and a claw 940. A fixed pin (not illustrated) is inserted into the long hole 930. The first cam follower 910 and the second cam follower 920 are pushed up by the came member 1143 provided in the back of the cam gear 114, as the cam gear rotates, the holding plate 900 moves to the developing roller 111 shown in FIG. 3 in its entirety. The claw 940 swings on a shaft 940a. On the top of the claw 940 there is provided a hook 941. The hook 941 enters, as the cam gear 114 rotates, between the exposed film unit and a film unit to be subsequently exposed, of a plurality of film units laminated within the film pack, and stops the edge of the lower end of the exposed film unit. The exposed film unit stopped with the hook 941 is carried from the film pack to the developing roller 111 as the holding plate 900 is moved.

Lastly, there will be explained a series of operations of the camera of the present embodiment in conjunction with FIG. 15 and FIGS. 16(a)–16(e).

Figure 15:
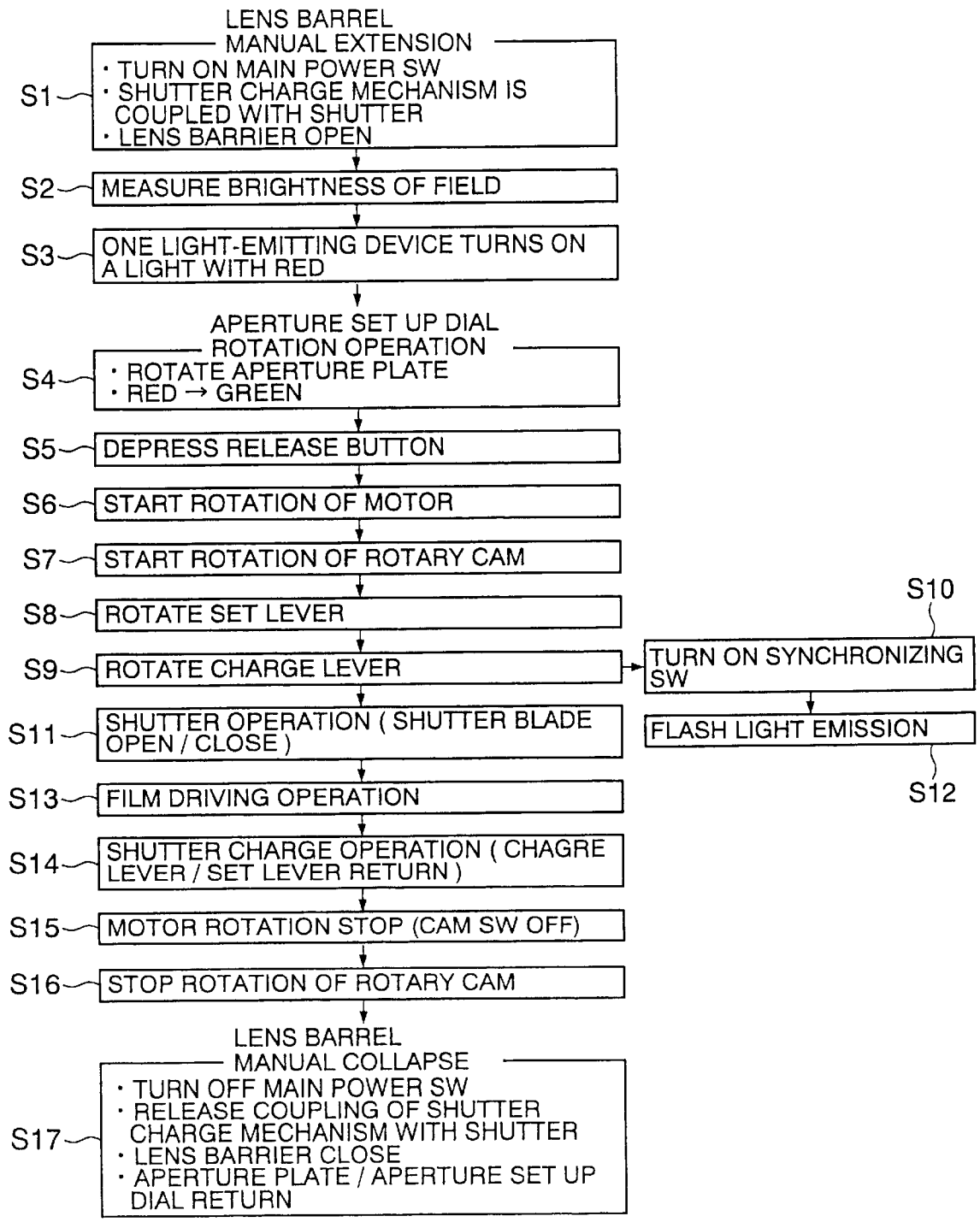
FIG. 15 is a flowchart useful for understanding a series of operations in the camera.

FIG. 15 is a flowchart useful for understanding a series of operations in the camera. FIGS. 16(a)–16(e) are views showing stepwise relations between the cam gear from starting of the rotation to the termination of the rotation and the member contacted to the cam gear.

First, a user extends the lens barrel 20, which collapses at a predetermined collapse position, to a predetermined extension position through a manual operation of a finger stop 201 shown in FIG. 1 (a step S1 in FIG. 15). Then, as shown in FIG. 7, the main power switch 115 is pushed by the projection piece 233 so as to turn on. Further, as shown in FIG. 8, the top end 521 of the charge lever 520 is coupled with the flange 412 of the shutter blade 410. That is, the shutter charge mechanism 500 is coupled with the shutter 400. Further, the lens barrier 22 shown in FIG. 11 is opened.

Next, when the user trains the camera 1 on the subject, the photometry 60 measures the brightness of field (a step S2 in FIG. 15), since the main power switch 115 turns on. In the event that the aperture value according to the measured brightness of field is different from the aperture value of the largest opening 611, the light-emitting device 92 (cf. FIG. 2) associated with the brightness of field turns on a light with red (a step S3 in FIG. 15).

Thereafter, when the user adjusts the index 91a to the light-emitting device turning on a light with red through the rotary operation of the aperture set up dial 91, the aperture plate 610 shown in FIG. 8 rotates in accordance with the operation of the aperture set up dial 91, so that the aperture value of the camera 1 is set up to the aperture value according to the brightness of field, and the light-emitting device 92 turning on a light with red changes over to turning on a light with green (a step S4 in FIG. 15). Incidentally, according to the camera 1, when the lens barrel 20 is collapsed, as mentioned above, the aperture plate 610 returns to the aperture value according to the largest opening 611 and the index 91a of the aperture set up dial 91 also returns to the position of the light-emitting device associated with the aperture value of the largest opening 611. Accordingly, in the event that the aperture value according to the brightness of field is the aperture value of the largest opening 611, the light-emitting device turns on a light with green from the beginning without turning on a light with red as in the step S3.

Figure 16A:
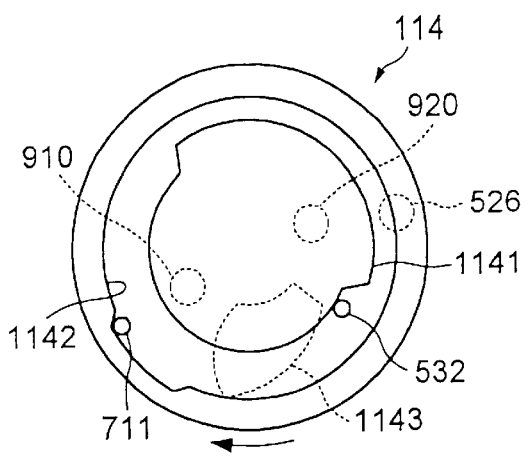
FIGS. 16(a)–16(e) are views showing stepwise relations between the cam gear from starting of the rotation to the termination of the rotation and the member contacted to the cam gear.

When the user pushes the release button 30 (a step S5 in FIG. 15), the motor 112 shown in FIG. 7 starts the rotation (a step S6 in FIG. 15), so that the cam gear 114 shown in FIG. 16(a) starts the rotation by the rotary driving force of the motor 112 (a step S7 in FIG. 15).

FIG. 16(a) is a view showing a relation between the cam gear and the member contacting with the cam gear at the time of the start of the rotation of the cam gear. It is noted that each of FIG. 16(a) to FIG. 16(e) is a view showing the state looking from the front side of the cam gear 114, wherein ones indicated by dotted lines are positioned at the back side of the cam gear 114. It is assumed that the cam gears 114 shown in FIG. 16(a) to FIG. 16(e) rotate clockwise (cf. the arrows shown in FIG. 16(a) to FIG. 16(e)).

As shown in FIG. 16(a), the first cam plane 1141 provided on a surface of the gear 114 is in contact with the cam follower 532 of the set lever, and the second cam plane 1142 provided on the surface of the gear 114 is in contact with the cam follower 711 of the cam switch lever. At the back of the cam gear 114, there is provided the cam member 1143. At the backside of the cam gear 114, the first cam follower 910 and the second cam follower 920 of the holding plate 900 are positioned, and in addition the cam follower 526 of the charge lever is positioned. Incidentally, the state of the cam gear 114 shown in FIG. 16(a) is the same as the state of the cam gear 114 shown in FIG. 8. Accordingly, as mentioned above, even if it is intended that the top end 521 of the charge lever kicks the flange of the shutter blade by enabling of the spring 524 shown in FIG. 7, it is blocked by the set lever 530.

Figure 16D:
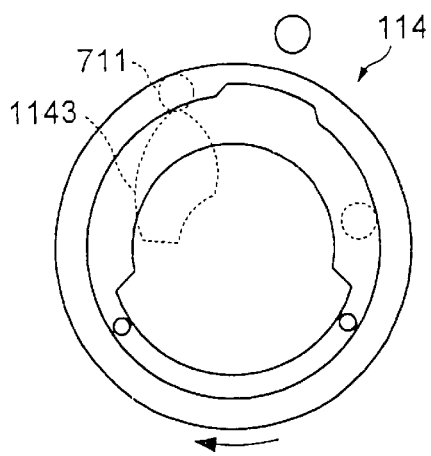
Figure 16B:
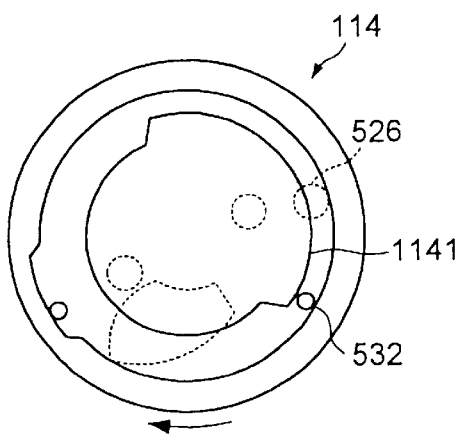

When the cam gear 114 rotates by 20° from the rotation start position, the relation between the cam gear 114 and the member contacting with cam gear is given by the state shown in FIG. 16(b).

FIG. 16(b) is a view showing the relation between the cam gear and the member contacting with cam gear when the set lever rotates.

As the cam gear 114 rotates, the cam follower 532 of the set lever is pushed up by the first cam plane 1141, and the set lever 530 shown in FIG. 13 rotates on the rotary shaft 530a opposing to the enabling force by a spring not illustrated (a step S8 in FIG. 15), so that the top 531 of the set lever 531 is lifted up in an enabling direction of the spring 524 shown in FIG. 7 for enabling the charge lever 520. As a result, the charge lever 520 rotates by the enabling force of the spring 524 (a step S9 in FIG. 15), so that the top end of charge lever 520 shown in FIG. 8 kicks the flange 412 of the shutter blade 410 (cf. an arrow P in FIG. 8), and the pin 525 shown in FIG. 14 pushes the synchronizing switch 800 indicating the light emission of the flash 40 and turns on the synchronizing switch 800 (a step S10 in FIG. 15). When the flange 412 of the shutter blade 410 is kicked by the top end 521 of charge lever 520, the shutter operation (cf. the arrow in FIG. 7) for opening and closing the shutter blade 410 is performed (a step S11 in FIG. 15), so that a film unit (not illustrated) is exposed by the photographic light. Further, in the event that the brightness of field is less than a predetermined threshold, the flash 40 emits light in synchronism with the shutter operation (a step S12 in FIG. 15). Incidentally, the rotation of the charge lever 520 causes the cam follower 526 of the charge lever 520 to move inside the cam gear 114.

Figure 16E:
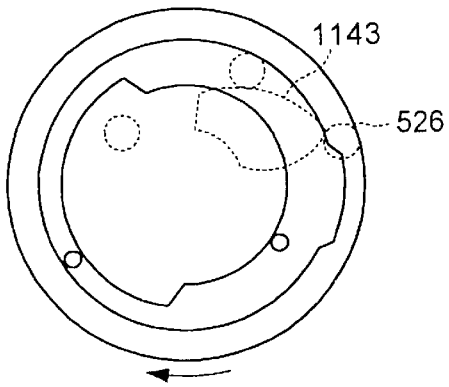
Figure 16C:
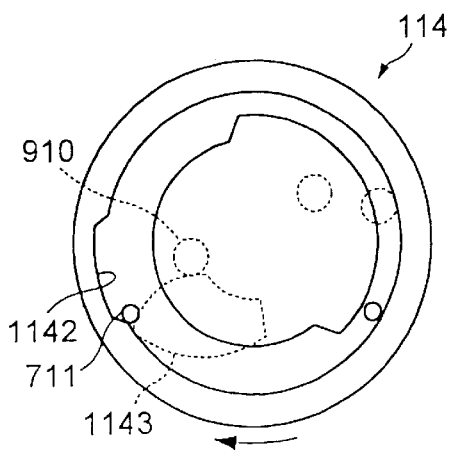

Thereafter, when the cam gear 114 rotates by 35° from the rotation start position, the relation between the cam gear 114 and the member contacting with cam gear is given by the state shown in FIG. 16(c). When the cam gear 114 rotates by 150° from the rotation start position, the relation between the cam gear 114 and the member contacting with cam gear is given by the state shown in FIG. 16(d).

FIG. 16(c) is a view showing the relation between the cam gear and the member contacting with cam gear when the holding plate starts the movement. FIG. 16(d) is view showing the relation between the cam gear and the member contacting with cam gear when the holding plate moves the largest distance.

As the cam gear 114 rotates, the first cam follower 910 of the holding plate 900 shown in FIG. 14 is pushed up by the cam member 1143, so that the film driving operation is performed (a step S13 in FIG. 15). First, as shown in FIG. 16(c), when it begins that the first cam follower 910 of the holding plate 900 is pushed up by the cam member 1143, the hook 941 of the claw 940 provided on the holding plate 900 shown in FIG. 14 enters between the exposed film unit and a film unit to be subsequently exposed, of a plurality of film units laminated within the film pack, and stops the edge of the lower end of the exposed film unit. The holding plate 900 starts in its entirety the movement to the developing roller 111 shown in FIG. 3. While the cam gear 114 further rotates from the rotation start position to the position of 150° shown in FIG. 16(d), the film unit stopped by the hook 941 is carried from the film pack to the developing roller 111. The film unit, which reaches the developing roller 111, is subjected to the developing processing and the transfer processing, and then discharged out of the camera. In the state shown in FIG. 16(c), the cam follower 711 of the cam switch lever 710 is pushed up by the second cam plane 1142, the cam switch lever 710 shown in FIG. 13 rotates on the rotary shaft 710a, so that the contact 712 of the cam switch lever 710 pushes up the cam switch 720 to switch from the turn-off state to the turn-on state. However, the control unit of the camera 1 does not detect that the cam switch 720 becomes the turn-on state.

Subsequently, when the cam gear 114 rotates further rotates from the rotation start position to the position of 245°, the relation between the cam gear 114 and the member contacting with cam gear is given by the state shown in FIG. 16(e).

FIG. 16(e) is a view showing the relation between the cam gear 114 and the member contacting with cam gear when the charge lever rotates in the opposite direction to the enabling direction by the spring.

When the cam gear 114 further rotates, so that the cam member 1143 of the cam gear 114 pushes up the cam follower 526 of the charge lever, the charge lever 520 rotates on the rotary shaft 520a shown in FIG. 8 in the opposite direction to the arrow P shown in FIG. 8, opposing to the enabling force of the spring 524 shown in FIG. 7. The rotation of the charge lever 520 causes the shutter charge operation to be performed, and the charge lever 520 returns to the state (cf. FIG. 16(a)) at the time of the start of the rotation of the cam gear 114 (a step S14 in FIG. 15). Further, the rotation of the charge lever 520 causes the contact plane 522 of the charge lever 520 to move in the enabling direction by a spring (not illustrated) for enabling the set lever 530, so that the set lever 530 is also rotated by the enabling force by the spring and the charge lever 520 returns to the state (cf. FIG. 16(a)) at the time of the start of the rotation of the cam gear 114 (the step S14 in FIG. 15).

Thereafter, as the cam gear 114 further rotates, the holding plate 900 returns to the position at the time of the start of the rotation of the cam gear 114. When the cam gear 114 rotates by 360° (cf. FIG. 16(a)), the cam follower 711 of the cam switch lever moves along the second cam plane 112, so that the cam switch lever 710 shown in FIG. 13 rotates on the rotary shaft 710a. The rotation of the cam switch lever 710 causes the contact 712, which pushes up the cam switch 720, to rotate in the opposite direction to the direction of pushing up the cam switch 720, so that cam switch 720 changes from the turn-on state to the turn-off state. The control unit (not illustrated), which is provided on the camera 1, detects that the cam switch 720 changes from the turn-on state to the turn-off state, and stops the rotation of the motor 112 (a step S15 in FIG. 15) to stop the rotation of the cam gear 114 (a step S16 in FIG. 15).

As mentioned above in conjunction with FIG. 16, according to the camera 1 of the present embodiment, it is possible to reliably perform a series of main operations of the camera in photography, and also it is possible to reduce the cost of the camera since simply one motor 112 as shown in FIG. 7 can be used as a source of power for performing a series of main operations as mentioned above.

When a user manually collapses the lens barrel 20 to a predetermined collapse position, the operation at a step S17 in FIG. 15 is performed in the camera 1. That is, the projection piece 233 shown in FIG. 7 goes back backwards the main power switch 115, so that the main power switch 115 turns off. Further, a coupling of the top end 521 of the charge lever 520 with the flange 412 of the shutter blade 410 is released to close the lens barrier 22. Furthermore, the aperture plate 610 returns to the aperture value of the largest opening 611, and the aperture set up dial 91 rotates in such a manner that the index 91a meets the position of the light-emitting device 92 associated with the aperture value of the largest opening 611 (a step S17 in FIG. 15).

Incidentally, according to the present embodiment, there is explained an example in which the present invention is applied to an instant camera in which a film is delivered out of the camera and is developed. However, the present invention is not restricted to the present embodiment, and it is applicable to the regular camera such a type that photography is performed on a long type of photographic films frame by frame.

As mentioned above, according to a camera of the present invention, it is possible to reduce a failure of photography due to user's forgetting of setting up of an aperture value, and also it is possible to implement reduction of the cost of the camera.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A camera having a lens barrel capable of extending and collapsing in which when the lens barrel is extended, photographic operation is available, said camera comprising:

an aperture member in which any one of a plurality of aperture values is set up in accordance with a mechanical force;

an aperture set up handler for varying a position or a posture in accordance with a set up operation for an aperture value; and a coupling member for mechanically coupling said aperture member with said aperture set up handler to transmit the position or the posture according to the set up operation for the aperture value by said aperture set up handler to said aperture member so that said aperture member is set up to an aperture value according to a position or a posture after the set up operation of said aperture set up handler, wherein said aperture member returns to an aperture value of a predetermined opening in accordance with a collapse operation of said lens barrel, and said aperture set up handler returns to a position or a posture to set up said aperture member to the aperture value of the predetermined opening in accordance with the collapse operation of said lens barrel.

2. A camera according to claim 1, wherein said aperture member is enabled in a direction to be set up to the aperture value of the predetermined opening of the plurality of aperture values, and said camera further comprises a click lever in which in an extension state of said lens barrel, even when said aperture member is set up to any one of the plurality of aperture values, said click is engaged with said aperture member to maintain the aperture value thus set up, and as said lens barrel transfers in a state from the extension state to a collapse state, said click lever at least temporarily releases an engagement with said aperture member to transfer said aperture member to the aperture value of the predetermined opening by an enabling force.

3. A camera according to claim 1, wherein said camera further comprises a photometry section for measuring brightness of field, and an instruction section for instructing a position or a posture of said aperture set up handler to set up said aperture member to an aperture value according to the brightness of field obtained through measurement by said photometry section.

4. A camera according to claim 3, wherein said instruction section has a plurality of light-emitting devices disposed at positions according to the position or the posture of said aperture set up handler.

5. A camera according to claim 4, wherein each of said plurality of light-emitting devices emits a plurality of lights.

6. A camera according to claim 1, wherein said lens barrel is manually extended and collapsed.

7. A camera according to claim 1, wherein said camera further comprises a main power switch, which turns on when the lens barrel is extended, and turns off when the lens barrel is collapsed.

* * * * *